United States Patent Office 3,374,234
Patented Mar. 19, 1968

3,374,234
THIOSEMICARBAZONES AND PROCESS FOR
THEIR MANUFACTURE
Vishwa Prakash Arya, Goregaon, Bombay, India, assignor
to Ciba Limited, Basel, Switzerland, a Swiss company
No Drawing. Filed June 8, 1965, Ser. No. 462,418
Claims priority, application Switzerland, June 11, 1964,
7,607/64; Apr. 26, 1965, 5,859/65
37 Claims. (Cl. 260—247.1)

The present invention relates to the manufacture of β-thiosemicarbazones of 1-aminoalkylisatines, particularly of compounds of the Formula I

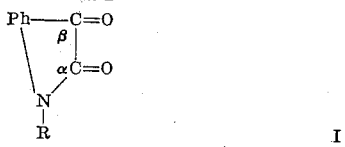

wherein Ph is a phenylene-(1,2) residue and R represents an alkyl radical containing an amino group.

The phenylene-(1,2) residue Ph is preferably unsubstituted. Alternatively it may contain substituents, such as lower alkyl or lower alkoxy groups, above all those containing 1 to 6 carbon atoms, such as methyl or ethyl, straight or branched propyl, butyl, pentyl or hexyl groups, as well as methoxy or ethoxy, straight or branched propoxy, butoxy, pentoxy or hexyloxy, hydroxyl, amino or nitro groups, or, more especially, halogen atoms, e.g. fluorine, chlorine, bromine or iodine atoms, or the pseudohalogen trifluoromethyl; furthermore, in combination with free hydroxyl groups also disubstituted amino methyl groups, in which the amino group contains above all the substituents mentioned below.

The alkyl radical containing the amino group is above all a lower alkyl radical, for example one of those mentioned above, more especially an ethyl, propyl, butyl, pentyl, a methylpropyl or methylbutyl group, above all a methyl group.

The amino group may be unsubstituted; preferably, however, it is substituted, more especially disubstituted. Suitable substituents are above all lower hydrocarbon residues, which may be substituted, such as by lower alkyl, hydroxy-lower alkyl or functionally converted hydroxy-lower alkyl, hydroxyl or functionally converted hydroxyl, such as etherified hydroxyl, e.g. lower alkoxy, or esterified hydroxyl, e.g. halogeno, carboxyl or functionally converted carboxyl, such as cyano or carbo-lower alkoxy, aryl, such as phenyl or substituted phenyl, or aralkyl, such as phenyl-lower alkyl or substituted phenyl-lower alkyl, the substituted phenyl radicals containing the groups substituting the phenylene-(1,2) residue Ph. A lower hydrocarbon residue may also be interrupted by heteroatoms, such as oxygen, sulfur or nitrogen; furthermore, it may be linked with the alkylene residue which connects the indoline nitrogen with the amino group.

As lower hydrocarbon residues there may be specially mentioned: Lower alkyl or alkenyl residues, such as methyl, ethyl, propyl, isopropyl; linear or branched butyl, pentyl, allyl or methallyl groups which may be linked in any desired position; unsubstituted or alkyl-substituted cycloalkyl or cycloalkenyl groups having more particularly 5 to 7 ring carbon atoms, such as cyclopentyl, cyclohexyl, cycloheptyl, cyclopentenyl or cyclohexenyl groups; unsubstituted or alkyl-substituted cycloalkyl- or cycloalkenylalkyl residues having more particularly 5 to 7 ring carbon atoms, such as cyclopentyl- or cyclohexenyl-methyl, -ethyl or -propyl groups; or alkylene or alkenylene residues having more especially 4 to 8 chain carbon atoms, for example butylene-(1,4), pentylene-(1,5), 1,5-dimethylpentylene-(1,5), hexylene-(1,6), hexylene-(1,5), heptylene-(1,7) or 2-pentenylene-(1,5), as well as aryl groups, such as phenyl or substituted phenyl. Residues of this kind, interrupted by hetero atoms, are for instance alkoxyalkyl or oxa-cycloalkyl-alkyl residues such as methoxyethyl, propoxyethyl, butoxyethyl, methoxypropyl, methoxyethoxyethyl, tetrahydrofurylmethyl, methylmercaptoethyl, oxa-, aza- or thiaalkylene residues such as 2-azabuten-(1,2)-ylene-(1,4), 2-azapenten-(1,2)-ylene-(1,5), 3-aza-, 3-oxa- or 3-thia-pentylene-(1,5), 3-aza-hexylene-(1,6), 1,5 - dimethyl-3-aza-pentylene-(1,5), 3-methyl-3-aza-pentylene - (1,5), 3 - hydroxyethyl-3-aza-pentylene-(1,5) or 3-carbethoxy-3-aza-pentenylene-(1,5) residues, or 3-phenyl-3-aza-pentylene-(1,5) residues whose phenyl residue may be substituted, for example as indicated above for Ph, as well as heterocyclic radicals of aromatic character, such as pyridyl groups. Tertiary aminoalkyl radicals in which one substituent of the tertiary amino group is connected with the alkylene residue which links the amino group with the indoline nucleus, are, for example, N-alkyl-pyrrolidinyl-2- or -3-alkyl radicals or N-alkyl-piperidyl-2- or -3-alkyl residues.

The new compounds possess valuable pharmacological properties. They are particularly effective against viruses. For example, they are, inter alia, suitable for treating virus infections, such as the infection of mice caused by the vaccinia virus. Furthermore, compounds of this invention show antibacterial effects, for example, against P. septica, or Staph. aureus, or central stimulating properties, as well as antihistaminic and analgesic activities. They are therefore useful accordingly, above all for the treatment of virus diseases, or as central stimulating, antibacterial, antihistaminic or analgesic agents. It is another special advantage of the new compounds that they form water-soluble acid salts. In addition, they have a relatively low toxicity.

Of special value are the compounds of the Formula Ia

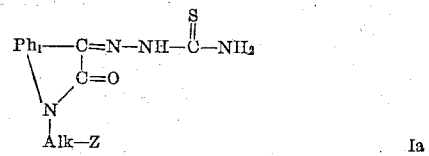

where $Ph_1$ represents a phenylene-(1,2) residue which may be unsubstituted or substituted by halogen or trifluoromethyl, Alk represents a lower alkylene group with 1 to 5 carbon atoms, for example ethylene, or a linear or branched propylene, butylene or pentylene residue such as propylene-(1,3), butylene-(1,4), pentylene-(1,5) or a methyl-ethylene, methyl-propylene, dimethyl-ethylene, methyl-butylene or dimethyl-propylene residue, above all methylene, and Z stands for a tertiary amino group, especially one of those mentioned above, above all a di-lower alkylamino group such as the dimethylamino, diethylamino, dipropylamino, N-methyl-N-ethylamino group, an N-lower alkyl-N-cycloalkylamino group, such as the N-methyl-N-cyclopentylamino or -cyclohexylamino group, as well as a dibenzylamino group, such as the dibenzylamino group, an alkyleneimino group with 4 to 7 carbon atoms, such as a pyrrolidino, piperidino, hexahydroazepino, octahydroazocino, morpholino or thiamorpholino group, for example, the pyrrolidino, piperidino, 3-ethylpiperidino, hexhydroazepino, octahydroazocino or morpholino group, or a piperazino-, such as N-methyl-, N-carbethoxy- or N-hydroxyethyl-piperazino group.

Special mention deserve those compounds of this group which correspond to the Formula Ib

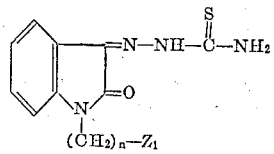

where $n$ is preferably 1 or 2, and $Z_1$ is a di-lower alkylamino group, such as the dimethylamino, diethylamino, dipropylamino, di-n-butylamino, di-isobutylamino, N-methyl-N-ethylamino group, an N-lower alkyl-N-cycloalkylamino group, such as the N-methyl-N-cyclopentyl or -cyclohexyl group, a pyrrolidino, piperidino or morpholino group, or a piperazino-, such as N-methyl or hydroxyethyl-piperazino group.

The new compounds are manufactured by known methods. Advantageously, a compound of the Formula II

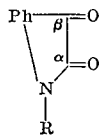

II where Ph and R have the above meanings, is reacted with thiosemicarbazide, or in a compound of the Formula III

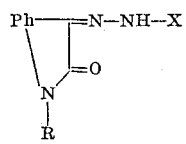

III where Ph and R have the above meanings, and X stands for a residue convertible into the thiocarbamyl group, said residue is so converted, or in a compound of the Formula IV

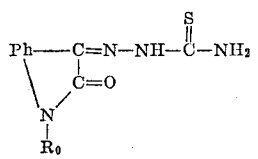

(IV)

wherein Ph has the previously given meaning, and $R_0$ is a reactive esterified hydroxy-alkyl radical, the reactive esterified hydroxyl group is converted into an amino group.

The above reactions are carried out in the usual manner; if desired, the starting materials are used in the form of salts. Instead of the β-oxo compounds there may be used their derivatives with a reactive, functionally modified oxo group, for example the acetals, mercaptals, acylates, semi-acetals, bisulphite compounds, oximes, anils, hydrazones, azines or semicarbazones, which are advantageously exchanged for the thiosemicarbazones grouping in an acidic medium.

The substituent X may be, for example, a hydrogen atom; a compound III with an unsubstituted hydrozono group may be converted into the desired thisemicarbazone by treatment with dithiocarbamic acid or a reactive derivative, such as an ester or amide thereof or with thiocyanic acid or a salt thereof, such as an ammonium or alkali metal thiocyanate. X may also be free or reactively modified dithiocarboxyl group which still contains a thiono group and which is converted into the thiocarbamyl group in the usual manner, in the case of the free acid or an ester thereof by reaction with ammonia. X may also represent the nitrile group which is converted into the thiocarbamyl group by an additive reaction with hydrogen sulphide.

A reactive esterified hydroxyl group is more particularly a hydroxyl group esterified with a strong inorganic, such as hydrohalic, e.g., hydrochloric or hydrobromic acid, or with a strong organic sulfonic, e.g., p-toluene sulfonic or methane sulfonic acid. Its conversion into the amino group is carried out by treatment with ammonia or with an amine.

The afore-mentioned reactions are carried out in the known manner, in the presence or absence of diluents and/or condensing agents, at room temperature or with cooling or heating, under atmospheric or super-atmospheric pressure.

β-Thiosemicarbazones of compounds of the Formula Ic.

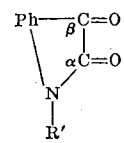

Ic wherein pH has the meaning given above and R′ is an amino-methyl radical in which the amino group is e.g., one of those mentioned above, especially a tertiary amino group, advantageously one of those emphasized above, may also be obtained by reacting a β-thiosemicarbazone of a compound of the Formula V

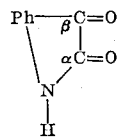

V with formaldehyde and ammonia or a primary or secondary amine. The reaction with formaldehyde and the amino-compound is carried out in accordance with the Mannich reaction. For example, instead of formaldehyde, an agent yielding formaldehyde may be used, for example trihydroxy-methylene or paraformaldehyde, if desired or required, in the presence of an acid. The amino compound may be used in the form of a salt. Preferably the reaction is performed in a diluent, for example in an alcohol, tetrahydrofuran or dioxan. When using polymerisation products of formaldehyde the reaction is advantageously carried out in an organic diluent as indicated above. The reaction is advantageously carried out at an elevated temperature and/or in a closed vessel.

Depending on the reaction conditions and starting materials used the final products are obtained in the free form or in the form of their salts which are likewise included in the present invention. The salts of the final products can be converted in known manner into the free bases, for example with alkalies or ion exchange resins. When the free bases are reacted with organic or inorganic acids, especially those which are capable of forming therapeutically useful salts, they yield salts. As such acids there may be mentioned, for example: hydrohalic acids, sulfuric or phosphoric acids, nitric and perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxy-maleic or pyruvic acid; phenylacetic, benzoic, para-aminobenzoic, anthranilic, para-hydroxybenzoic, salicylic or para-amino-salicyclic acid, embonic, methane-sulphonic, ethanesulphonic, hydroxyethane-sulphonic, ethylenesulphonic acid; halobenzenesulphonic, toluene-sulphonic, naphthalenesulphonic acids or sulphanilic acid; methionine, tryptophan, lysine or arginine.

The above-mentioned or other salts of the new compounds, for example the picrates, may also be used for purifying the resulting free bases by converting them into salts, separating the salts and liberating the bases from them. In view of the close relationship between the new compounds in the free form and in the form of their salts, what has been said above and hereinafter concerning the free bases applies also to the corresponding salts wherever this is suitable and advantageous.

The invention includes also any modification of the present process in which an intermediate obtained at any stage is used as starting material and any remaining step or steps is/are carried out or the process is discontinued at any stage thereof, or in which the starting materials are formed under the reaction conditions, or in which the reactants are used in the form of their salts.

The starting materials used in the reactions of the present process are preferably such as give rise to the preferred compounds referred to above.

The starting materials are known or can be prepared by known methods.

Thus, N-unsubstituted isatins can be subjected to the Mannich reaction with formaldehyde and ammonia or with primary or secondary amines, or they can be reacted in the form of their alkali metal salts or in the presence of condensing agents capable of forming such salts with reactive esters such as halides of aminoalkanols or with a toluene-sulphonic acid ester of a chloralkanol, whereupon, if desired, the halogen atom may be exchanged for the amino group.

The new compounds may be used as medicaments, for example in the form of pharmaceutical preparations which contain them or their salts in conjunction or admixture with a pharmaceutical organic or inorganic, solid or liquid excipient suitable for enteral or parenteral administration. Suitable excipients are substances that do not react with the new compounds, for example water, lactose, starches, magnesium stearate, talcum, vegetable oils, benzyl alcohols, gums, polyalkyleneglycols or other known medicinal excipients. The pharmaceutical preparations may be, for example, tablets or dragées, or in liquid form solutions, suspensions or emulsions. They may be sterilized and/or they may contain assistants such as preserving, stabilising, wetting or emulsifying agents, salts for regulating the osmotic pressure, buffers and/or solution promoters. They may further contain other therapeutically useful substances. The preparations are formulated in the known manner.

The following examples illustrate the invention.

Example 1

A mixture of 9.84 g. of 1-morpholinomethyl-isatin, 3.46 g. of thiosemicarbazide and 1 liter of absolute ethanol is boiled under reflux for 1½ hours, then concentrated to a volume of 50 ml. and cooled. The precipitated crystals are filtered off and recrystallized from aqueous ethanol, to yield 1-morpholino-methyl-isatin-3-thiosemicarbazone monohydrate of the formula

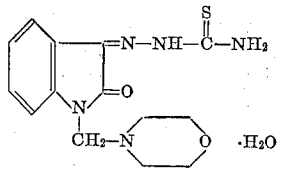

melting at 206–207° C.

The starting material is prepared as follows:

14.7 g. of isatin, 8.7 g. of morpholine and 9 ml. of 37% aqueous formaldehyde solution are mixed with 1150 ml. of benzene and boiled under reflux for 8 hours. On cooling, 1-morpholinomethyl-isatin crystallizes out. After recrystallization from a mixture of ethanol, ethyl acetate and methylethylketone it melts at 203° C.

Example 2

A mixture of 6.15 g. of 1-(N' - phenyl - piperazinomethyl)-isatin, 1.82 g. of thiosemicarbazide and 500 ml. of absolute ethanol is boiled under reflux for 1½ hours, then concentrated to 25 ml. and cooled. The precipitated crystals are filtered off and recrystallized from ethanol, to yield 1-(N'-phenyl-piperazino-methyl)-isatin - 3 - thiosemicarbazone of the formula

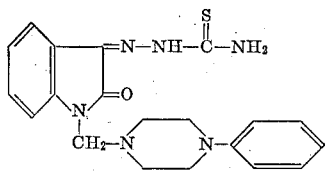

melting at 191° C. with decomposition.

The starting material is prepared as follows:

14.7 g. of isatin, 16.2 g. of N-phenyl-piperazine and 9 ml. of 37% aqueous formaldehyde solution are mixed with 1150 ml. of benzene and refluxed for 6 hours. On cooling, 1-(N' - phenyl - piperazinomethyl)-isatin crystallizes out. After recrystallization from ethyl acetate it melts at 212–213° C.

Example 3

A solution of 8.8 g. of isatin-3-thiosemicarbazone in 150 ml. of tetrahydrofuran is treated with 5.2 g. of N-β-hydroxyethyl-piperazine and 3.6 ml. of 37% aq. formaldehyde solution. The reaction mixture is boiled under reflux for 3 hours. The solvent is evaporated off. On trituration of the residue with 3 ml. of ethanol followed by cooling, the 1 - N - (N' - β - hydroxyethyl - piperazinomethyl)-isatin-3-thiosemicarbazone of the formula

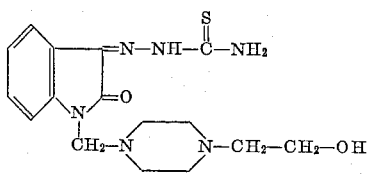

crystallizes out. It is recrystallized from absolute ethanol and melts at 125° C.

1-N-(N' - β - hydroxyethyl-piperazino methyl)-isatin-3-thiosemicarbazone forms a dihydrochloride monohydrate which melts at 190° C. (dec.). This compound is also prepared by the reaction of thiosemicarbazide on 1-N-(N'-β-hydroxyethyl piperazino)-methyl-isatin melting at 145–146° C. followed by treatment with hydrochloric acid.

Example 4

A solution of 4.4 g. isatin-3-thiosemicarbazone in 100 ml. tetrahydrofuran is treated with 1.42 g. morpholine and 1.8 ml. 37% formaldehyde solution. The reaction mixture is boiled under reflux for 3 hours. On cooling, the 1 - N - (morpholinomethyl)-isatin-3-thiosemicarbazone of the formula

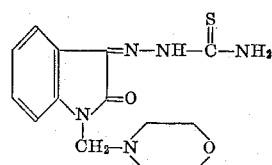

crystallizes out. It is recrystallized from absolute ethanol and melts at 215–216° C.

The following compounds are prepared in a manner similar to that described in Example 4:

1-N-(dimethyl-aminomethyl) - isatin-3-thiosemicarbazone, M.P. 160° C.

1-N-(di-ethyl-aminomethyl)-isatin - 3 - thiosemicarbazone, M.P. 135° C.

1-N-(di-n-butyl-aminomethyl)-isatin - 3 - thiosemicarbazone, M.P. 110° C.

1-N-(N-methylcyclohexylaminomethyl) - isatin-3-thiosemicarbazone, M.P. 165° C.

1-N-(N-cyclohexyl - 2 - hydroxypropylaminomethyl)-isatin-3-thiosemicarbazone, M.P. 149–150° C.

1-N-(2,6-dimethyl morpholinomethyl)-isatin - 3 - thiosemicarbazone, M.P. 185° C.

1-N-(di-iso octylaminomethyl)-isatin-3-thiosemicarbazone, M.P. 190° C. (dec.).

Example 5

A solution of 8.8 g. of isatin-3-thiosemicarbazone in 150 ml. of tetrahydrofuran is treated with 5.16 g. of diisobutylamine and 3.6 ml. of 37% aq. formaldehyde solution. The reaction mixture is boiled under reflux for 3 hours. The solvent is removed under reduced pressure. On addition of 3 ml. of ethanol to the residue followed by cooling, the 1-N-(di-isobutylaminomethyl)-isatin-3-thiosemicarbazone of the formula

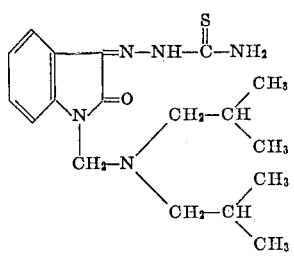

crystallizes out. It is recrystallized from absolute ethanol and melts at 185° C.

*Example 6*

A solution of 5 g. 1-N-anilinomethyl isatin and 3.2 g. thiosemicarbazide in 10 ml. dimethyl formamide and 2 ml. of glacial acetic acid is heated at 80° for 5 minutes and then left at room temperature for ½ hour. Water is added and the crystalline precipitate is filtered off, washed with alcohol and recrystallized from dimethyl formamide-alcohol to give 1-N-(anilinomethyl)-isatin-3-thio-semicarbazone of the formula

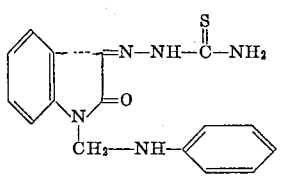

with a melting point of 189–191° C.

The starting material is obtained as follows:

A solution of 5.88 g. isatin and 3.72 g. aniline in 150 ml. of ethanol containing 3.72 g. 37% aq. formaldehyde is heated with stirring under reflux for 3½ hours. The reaction mixture is cooled in ice and the crystalline product filtered off. Concentration of the filtrate affords more of the same material. The total product on recrystallization from tetrahydrofuran has M.P. 200–201° C.

The following compounds are prepared in a manner similar to that described in Example 6:

1-N-(p-chloroanilino)-methyl - isatin-3-thiosemicarbazone, M.P. 199–202° C. starting from 1-N-(p-chloroanilino)-methyl-isatin which melts at 209–211° C.

1-N-(m-trifluoromethylanilino)-methyl - isatin-3-thiosemicarbazone, M.P. 224–226° C. (dec.) starting from 1-N-(m-trifluoromethylanilino)-methyl-isatin which melts at 185–187° C.

1-N-(p-fluoroanilino)-methyl - isatin-3-thiosemicarbazone, M.P. 204–206° C. (dec.) starting from 1-N-(p-fluoroanilino)-methyl-isatin which melts at 189–191° C.

1-N-(m,p-dichloroanilino) - methyl-isatin-3-thio-semicarbazone, M.P. 204–208° C. starting from 1-N-(m,p-dichloroanilino)-methyl-isatin which melts at 239–240° C.

1-N-(2-pyridyl)-amino - methyl-isatin - 3 - thiosemicarbazone, M.P. 211–213° C. (dec.) starting from 1-N-(2-pyridyl)-amino-methyl-isatin which melts at 190–192° C.

*Example 7*

A solution of 8.8 g. of isatin-3-thiosemicarbazone in 150 ml. of tetrahydrofuran is treated with 3.94 g. of dibenzylamine and 3.6 ml. of 37% aq. formaldehyde solution. The reaction mixture is boiled under reflux for 4 hours. The solvent is distilled off under reduced pressure. On trituration of the residue with isopropanol followed by cooling, the 1-N-(dibenzylaminomethyl)-isatin-3-thiosemicarbazone of the formula

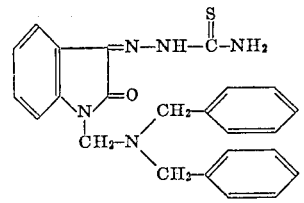

crystallizes out. It is recrystallized from methanol and melts at 160° C.

Likewise, 1-N-(N-methylbenzylamino)-methyl-isatin-3-thiosemicarbazone monohydrate, M.P. 150° C. is prepared.

*Example 8*

A solution of 8.8 g. isatin-3-thiosemicarbazone in 150 ml. of tetrahydrofuran is treated with 3.96 g. of 3-methylpiperidine and 3.6 ml. of 37% aq. formaldehyde solution. The reaction mixture is boiled under reflux for 3 hours. The solvent is evaporated to dryness. On trituration of the residue with 2 ml. of ethanol followed by cooling, the 1-N-(3-methylpiperidinomethyl)-isatin-3-thiosemicarbazone of the formula

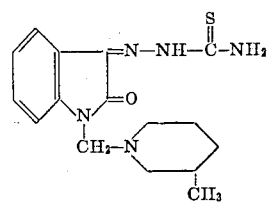

crystallizes out. It is recrystallized from absolute ethanol and melts at 172° C.

The following compounds are prepared in a manner similar to that described in Example 8:

1-N-(pyrrolidinomethyl)-isatin-3 - thiosemicarbazone, M.P. 177–178° C.

1-N-(piperidinomethyl)-isatin - 3 - thiosemicarbazone, M.P. 174° C.

1-N-(2-methylpiperidinomethyl)-isatin-3 - thiosemicarbazone, M.P. 152° C.

1-N-(4-methylpiperidinomethyl)-isatin-3 - thiosemicarbazone, M.P. 176° C.

1-N-(2-ethylpiperidinomethyl)-isatin - 3 - thiosemicarbazone, M.P. 148° C.

*Example 9*

A solution of 8.8 g. of isatin-3-thiosemicarbazone in 150 ml. of tetrahydrofuran is treated with 4.52 g. of 3-ethylpiperidine and 3.6 ml. of 37% aq. formaldehyde solution. The reaction mixture is boiled under reflux for 3 hours. The solvent is removed under reduced pressure. On trituration of the residue with absolute ethanol followed by cooling, the 1-N-(3-ethylpiperidino-methyl)-isatin-3-thiosemicarbazone hemihydrate of the formula

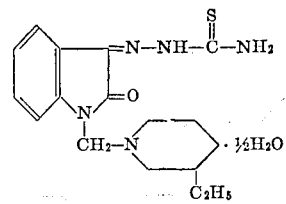

crystallizes out. It is recrystallized from methanol and melts at 140° C.

The following compounds are prepared in a manner similar to that described in Example 9:

1-N-[(2-diphenylmethyl)-piperidino]-methyl-isatin - 3-thiosemicarbazone, M.P. 120° C.

1-N-(3-hydroxypiperidinomethyl)-isatin-3-thiosemicarbazone hemihydrate, M.P. 170° C.

1-N-(4-n-propoxy-4-phenyl-piperidinomethyl) - isatin-3-thiosemicarbazone, M.P. 178° C.

1-N-(4-cyano-4-phenyl-piperidinomethyl) - isatin - 3-thiosemicarbazone, M.P. 203–204° C.

1-N-(4-carboxypiperidinomethyl)-isatin-3 - thiosemicarbazone, M.P. 195–196° C.

1-N-(1,2,3,6-tetrahydro-1-pyridyl-methyl) - isatin - 3-thiosemicarbazone, M.P. 170–171° C.

1-N-(4-phenyl-1,2,3,6-tetrahydro - 1 - pyridyl-methyl)-isatin-3-thiosemicarbazone, M.P. 170° C.

Example 10

A solution of 8.8 g. isatin-3-thiosemicarbazone in 150 ml. of tetrahydrofuran is treated with 3.96 g. of hexamethyleneimine and 3.6 ml. of 37% aq. formaldehyde solution. The reaction mixture is boiled under reflux for 3 hours. The solvent is evaporated to dryness. On trituration of the residue with 3 ml. of ethanol followed by cooling, the 1-N-(hexamethyleneimino-methyl)-isatin-3-thiosemicarbazone of the formula crystallizes out. It is recrystallized from absolute ethanol and melts at 155° C.

Example 11

A solution of 8.8 g. isatin-3-thiosemicarbazone in 150 ml. of tetrahydrofuran is treated with 4.52 g. of octahydroazocine and 3.6 ml. of 37% aq. formaldehyde solution. The reaction mixture is boiled under reflux for 3 hours. The solvent is evaporated to dryness. On trituration of the residue with 3 ml. of ethanol followed by cooling, the 1-N-(octahydroazocino-methyl)-isatin - 3 - thiosemicarbazone of the formula crystallizes out. It is recrystallized from absolute ethanol and melts at 165° C.

Example 12

A solution of 8.8 g. of isatin-3-thiosemicarbazone in 150 ml. of tetrahydrofuran is treated with 4 g. of N-methyl-piperazine and 3.6 ml. of 37% aq. formaldehyde solution. The reaction mixture is boiled under reflux for 3 hours. The solvent is distilled off under reduced pressure. The residue is dissolved in ethyl acetate and dry-hydrogen chloride gas is passed into this solution. A hygroscopic crystalline precipitate is formed which is recrystallized from isopropanol-ether to afford the 1-N-(N'-methylpiperazinomethyl) - isatin - 3 - thiosemicarbazone monohydrochloride dihydrate of the formula which melts at 200° C. (dec.).

The following compounds are prepared in the manner described for Example 12:

1 - N - (N' - 2 - ethylphenylpiperazinomethyl) - isatin-3-thiosemicarbazone monohydrochloride dihydrate, M.P. 155° C. (dec.).

1 - N - [N' - (4 - fluorophenyl)-piperazino] - methyl-isatin-3-thiosemicarbazone, M.P. 150° C.

Example 13

A solution of 8.8 g. of isatin-3-thiosemicarbazone in 150 ml. of tetrahydrofuran is treated with 6.32 g. of N-carbethoxypiperazine and 3.6 ml. of 37% aq. formaldehyde solution. The reaction mixture is boiled under reflux for 3 hours. The solvent is evaporated off. On trituration of the residue with 5 ml. of ethanol followed by cooling, the 1 - N - (N' - carbethoxypiperazinomethyl) - isatin - 3-thiosemicarbazone of the formula crystallizes out. It is recrystallized from absolute ethanol and melts at 178° C.

Example 14

A solution of 4 g. of 5-bromo-isatin-3-thiosemicarbazone in 75 ml. of tetrahydrofuran is treated with 1.5 g. of morpholine and 1.2 ml. of 37% aq. formaldehyde solution. The reaction mixture is boiled under reflux for 3 hours. The solvent is distilled off under reduced pressure. On trituration of the residue with 5 ml. of absolute ethanol, the 5-bromo-1-N-(morpholinomethyl) - isatin - 3-thiosemicarbazone of the formula crystallizes out. It is recrystallized from methanol and melts at 193° C.

Example 15

A solution of 8.8 g. of isatin-3-thiosemicarbazone in 150 ml. of tetrahydrofuran is treated with 5.7 g. of bis-(β-chloroethyl)-amine and 3.6 ml. of 37% aq. formaldehyde solution. The reaction mixture is boiled under reflux for 3 hours. The solvent is distilled off under reduced pressure. On trituration of the residue with 5 ml. of ethanol followed by cooling, the 1-N-(di-β-chloroethyl-aminomethyl)-isatin-3-thiosemicarbazone of the formula crystallizes out. It is recrystallized from isopropanol and melts at 150° C.

Example 16

A solution of 2.5 g. of 1-(2-dimethylaminoethyl)-isatin hydrochloride in 30 ml. of ethanol is added to a warm solution of 0.9 g. of thiosemicarbazide in 10 ml. of 10% acetic acid. The reaction mixture is boiled under reflux for 2 hours. On cooling, a heavy crystalline precipitate appeared which is filtered off and recrystallized from methanol-ethyl acetate to afford 1-(2-dimethylaminoethyl)-isatin-3-thiosemicarbazone monohydrochloride hemihydrate of the formula

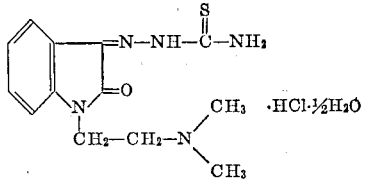

which melts at 255° C. (dec.).

The starting material is obtained as follows:

17 g. of isatin-sodium in 100 ml. of dioxane is treated with 50 g. of 2-dimethylaminoethylchloride and heated in a steel tube at 120° for 8 hours. After cooling, the reaction mixture is filtered and the residue washed with tetrahydrofuran. The filtrate and the washings are combined and evaporated to dryness. The residue is dissolved in ethyl acetate and dry hydrogen chloride is passed into the solution. The hygroscopic precipitate formed, is filtered and recrystallized from methanol-ether to afford 1-(2-dimethylaminoethyl)-isatin hydrochloride which melts at 221° C. (dec.).

*Example 17*

16.9 g. of isatin-sodium in 150 ml. of dioxane is treated with 15 g. of 1-β-chloroethylpiperidine and heated in a steel tube at 120° C. for 8 hours. On cooling, the reaction mixture is diluted with 100 ml. of tetrahydrofuran and filtered. The residue is washed with tetrahydrofuran. The filtrate and washings are combined and evaporated to dryness. The residue is dissolved in ethylacetate and dry hydrogen chloride gas is passed into the solution. 21 g. of a very hygroscopic precipitate of 1-(2-N-piperidino-ethyl)-isatin hydrochloride is obtained which is used as such in the next step.

21 g. of the crude 1-(2-piperidino-ethyl)-isatin hydrochloride in 65 ml. of ethanol is added dropwise to a solution of 6 g. of thiosemicarbazide in 100 ml. of 10% acetic acid. The reaction mixture is boiled under reflux for 2 hours. On cooling, a heavy precipitate is formed which is filtered and recrystallized from methanol to afford the 1-(2-piperidinoethyl)-isatin-3-thiosemicarbazone monohydrochloride monohydrate of the formula

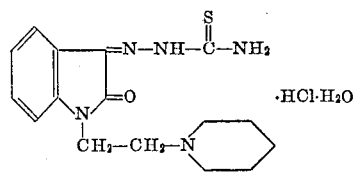

which melts at 278° C. (dec.).

*Example 18*

17 g. of isatin-sodium in 100 ml. of dioxane is treated with 50 g. of 3-dimethylaminopropylchloride and heated in a steel tube at 120° C. for 8 hours. On cooling, the reaction mixture is filtered and the residue is washed with tetrahydrofuran. The filtrate and washings are combined and evaporated to dryness. The residue is dissolved in ethyl acetate and dry hydrogen chloride is passed into the solution. 20 g. of the hygroscopic precipitate of 1-(3-dimethylaminopropyl)-isatinhydrochloride is obtained which is used as such in the next step.

20 g. of crude 1-(3-dimethylaminopropyl)-isatin-hydrochloride in 60 ml. of ethanol is added dropwise to a warm solution of 6 g. of thiosemicarbazide in 100 ml. of 100% acetic acid. The reaction mixture is boiled under reflux for 2 hours. On cooling, a heavy crystalline precipitate appeared which is filtered and recrystallized from methanol to afford the 1-(3-dimethylaminopropyl)-isatin-3-thiosemicarbazone monohydrochloride sesquihydrate of the formula

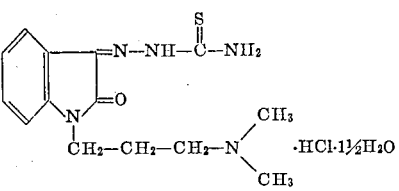

which melts at 252° C. (dec.).

*Example 19*

8.5 g. of isatin-sodium in 100 ml. of dioxane is treated with 10 g. of γ-chloropropyl-piperidine hydrochloride and 5.05 g. of triethylamine. The reaction mixture is heated at 120° in a steel tube for 8 hours. On cooling, the contents are diluted with 150 ml. of tetrahydrofuran and filtered. The residue is washed with tetrahydrofuran; the filtrate and washings are combined and evaporated to dryness. The residue is dissolved in ethyl acetate and dry hydrogen chloride is passed into this solution. The hygroscopic precipitate (18 g.) of 1-(3-N-piperidinopropyl)-isatinhydrochloride thus obtained is used as such in the next step.

18 g. of crude 1-(3-N-piperidinopropyl)-isatin hydrochloride is dissolved in 60 ml. of ethanol and the solution is added dropwise to a warm solution of 6.2 g. of thiosemicarbazide in 100 ml. of 10% acetic acid. The reaction mixture is boiled under reflux for 2 hours. On cooling, a crystalline precipitate is formed which is filtered off and recrystallized from methanol-ethyl acetate-ether to afford 1 - (3 - N - piperidino propyl)-isatin-3-thiosemicarbazone monohydrochloride monohydrate of the formula

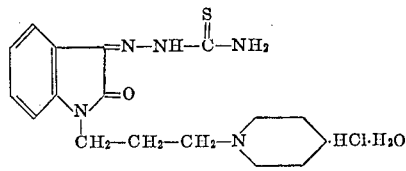

which melts at 270° C. (dec.).

*Example 20*

A mixture of 6.2 g. of 1-(3-aminopropyl)-isatin hydrochloride and 2.8 g. of thiosemicarbazide in 20 ml. of ethanol is refluxed for 10 minutes. Initially a solution is obtained, which starts depositing crystals as the reaction proceeds. The resultant mixture is cooled and filtered. The product is recrystallized from aqueous methanol to afford the 1-(3-aminopropyl)-isatin-3-thiosemicarbazone hydrochloride of the formula

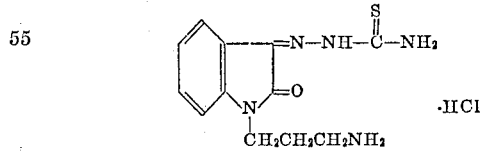

with a melting point of 215° C. (decomp.).

The starting material is made as follows:

A mixture of 4.5 g. 1-(2-cyanoethyl)-isatin, 15 ml. of ethylene-glycol and 50 ml. of drybenzene containing a few crystals of p-toluenesulphonic acid is heated under reflux. The water formed is continuously removed. After several hours, the benzene solution is washed with aqueous sodium bicarbonate, dried and the solvent removed to afford the ethyleneketal of 1-(2-cyanoethyl)-isatin which, crystallized from aqueous methanol, has M.P. 120–122°. 12.2 g. of this substance is dissolved in 250 ml. of methanol presaturated at 0° C. with ammonia and the solution submitted to hydrogenation at a pressure of 100 atmospheres to hydrogen and temperature of 50° C., using 1 teaspoon of Raney nickel catalyst. After the hydrogenation is over, the catalyst is filtered off and the filtrate evaporated in vacuo to leave a residue of 1-(3-amino-propyl)-isatin ethylene ketal as an oil. 6 g. of the oil is suspended in 120 ml. of 3 N hydrochloric acid and heated at 90° for 2 hours when a clear red solution is obtained. On evaporation of the solution in vacuo to dryness, a crystalline solid is obtained. Recrystallization from moist alcohol-benzene mixture afforded 1-(3-aminopropyl)-isatin hydrochloride, not melting up to 315° C.

*Example 21*

A suspension of 4.3 g. of 1-(3-N-benzylaminopropyl)-isatin hydrochloride and 1.6 g. of thiosemicarbazide in 50 ml. of methanol is refluxed for ½ hour. The solution is evaporated to dryness and the residual gum triturated with absolute alcohol to give a crystalline product. Recrystallization from methanol-ethylacetate yields 1-(3-N'-benzylaminopropyl)-isatin - 3 - thiosemicarbazone hydrochloride of the formula

[Structure: isatin-3-thiosemicarbazone with =N—NH—C(S)—NH$_2$, C=O, N—CH$_2$CH$_2$CH$_2$NHCH$_2$C$_6$H$_5$ · HCl]

with a melting point of 240–243° C. (decomp.).
The starting material for the above reaction is obtained as follows:

A solution of 6 g. of crude ethyleneketal of 1-(3-aminopropyl)-isatin and 3 g. of benzaldehyde in 30 ml. of benzene is heated under reflux for 1 hour. The solution is filtered and the filtrate evaporated. The residue is dissolved in 25 ml. of methanol and treated with 0.6 g. of sodium borohydride. After being left overnight, the solution is concentrated, treated with water and extracted with ether. The basic product is now extracted into 2 N hydrochloric acid. The acid extract is heated on the steam bath for ½ hour and evaporated to dryness. The residue is crystallized from methanol-alcohol mixture to yield 1-(3-N'-benzyl-aminopropyl)-isatin hydrochloride, M.P. 199° (decomp.).

*Example 22*

1 g. of 1-N-(p-toluene-sulphonyloxymethyl)-isatin-3-thiosemicarbazone hemihydrate is boiled with 5 ml. morpholine at 130° C. for 6 hours. On cooling, excess morpholine is distilled off and the residue is triturated with water and extracted with ethyl acetate. The ethyl acetate extract is dried over anhydrous sodium sulphate and evaporated to dryness. The crude residue is recrystallized from methanol to afford the 1-N-(morpholino-methyl)-isatin-3-thiosemicarbazone of the formula

[Structure: isatin-3-thiosemicarbazone with =N—NH—C(S)—NH$_2$, C=O, N—CH$_2$—N(morpholine ring)]

which melts at 215–216° C. This compound is identical with compound described under Example 4.

The starting material is obtained as follows:
4 g. of 1-(hydroxymethyl)-isatin-3-thiosemicarbazone is dissolved in 50 ml. pyridine, the solution cooled to 0° C. and 3.5 g. of p-toluene sulphonyl chloride is added portionwise and the reaction temperature is maintained at 5° C. The reaction mixture is stirred at room temperature for 24 hours, poured into ice and extracted with ethyl acetate. The organic extract is washed with 2 N hydrochloric acid solution, dried over anhydrous sodium sulphate and evaporated to dryness. The residue is recrystallized from isopropanol to afford the 1-(p-toluene-sulphonyloxymethyl) - isatin - 3 - thiosemicarbazone hemihydrate, M.P. 240° C.

What is claimed is:
1. A member selected from the group consisting of a compound of the formula

[Structure (Ia): Ph$_1$—C(=N—NH—C(S)—NH$_2$)—C(=O)—N—Alk-Z]

wherein Ph$_1$ is a member selected from the group consisting of phenylene-(1,2), (halogeno)-phenylene-(1,2) and (trifluoromethyl)-phenylene-(1,2), Alk is an alkylene radical with 1–5 carbon atoms, and Z is a member selected from the group consisting of di-lower alkylamino, N-lower alkyl-N-cycloalkyl-amino, dibenzylamino, alkylene-imino with 4 to 7 carbon atoms, a morpholino, a thia-morpholino and a piperazino group, and an acid addition salt thereof.

2. A member selected from the group consisting of a compound of the formula

[Structure: isatin-3-thiosemicarbazone with =C(=N—NH—C(S)—NH$_2$)—C(=O), N—(CH$_2$)$_n$—Z$_1$]

wherein $n$ is one of the integers 1 and 2, $Z_1$ is a member selected from the group consisting of di-lower alkylamino, N-lower alkyl-N-cycloalkyl-amino, a pyrrolidino, a piperidino, a morpholino and a piperazino group, and an acid addition salt thereof.

3. 1-morpholino-methyl-isatin-3-thiosemicarbazone.
4. 1 - (4 - phenyl-piperazino-methyl)-isatin-3-thiosemicarbazone.
5. 1 - (4 - β-hydroxyethyl-piperazino-methyl)-isatin-3-thiosemicarbazone.
6. 1-dimethylamino-methyl-isatin-3-thiosemicarbazone.
7. 1-dimethylaminomethyl-isatin-3-thiosemicarbazone.
8. 1 - di - n - butyl-aminomethyl-isatin-3-thiosemicarbazone.
9. 1 - N - methyl-N-cyclohexyl-amino-methyl-isatin-3-thiosemicarbazone.
10. 1 - (2,6-dimethylmorpholino-methyl)-isatin-3-thiosemicarbazone.
11. 1 - di-isooctylamino-methyl-isatin-3-thiosemicarbazone.
12. 1 - di-isobutylamino-methyl-isatin-3-thiosemicarbazone.
13. 1 - dibenzylamino - methyl-isatin-3-thiosemicarbazone.
14. 1 - N - benzyl-N-methylaminomethyl-isatin-3-thiosemicarbazone.
15. 1 - (3-methyl-piperidino-methyl)-isatin-3-thiosemicarbazone.
16. 1-pyrrolidino-methyl-isatin-3-thiosemicarbazone.
17. 1-piperidinomethyl-isatin-3-thiosemicarbazone.
18. 1 - (2 - methyl-piperidinomethyl)-isatin-3-thiosemicarbazone.
19. 1 - (4 - methyl-piperidinomethyl)-isatin-3-thiosemicarbazone.
20. 1 - (2-ethyl-piperidinomethyl)-isatin-3-thiosemicarbazone.
21. 1 - (3-ethyl-piperidinomethyl)-isatin-3-thiosemicarbazone.
22. 1 - (2 - diphenylmethyl-piperidinomethyl)-isatin-3-thiosemicarbazone.
23. 1 - (3 - hydroxy - piperidino-methyl)-isatin-3-thiosemicarbazone.
24. 1 - (4-propyloxy-4-phenyl-piperidinomethyl)-isatin-3-thiosemicarbazone.
25. 1 - (4 - cyano-4-phenyl-piperidinomethyl)-isatin-3-thiosemicarbazone.

26. 1-(4-carboxy-piperidinomethyl)-isatin-3-thiosemicarbazone.
27. 1-(1,2,3,6-tetrahydro-1-pyridylmethyl)-isatin-3-thiosemicarbazone.
28. 1-hexamethyleneimino-methyl-isatin-3-thiosemicarbazone.
29. 1-octahydroazocino-methyl-isatin-3-thiosemicarbazone.
30. 1-(4-methyl-piperazino-methyl)-isatin-3-thiosemicarbazone.
31. 1-(4-o-ethylphenyl-piperazino-methyl)-isatin-3-thiosemicarbazone.
32. 1-(4-fluorophenyl-piperazino-methyl)-isatin-3-thiosemicarbazone.
33. 5-bromo-1-morpholinomethylisatin-3-thiosemicarbazone.
34. 1-β-dimethylaminoethyl-isatin-3-thiosemicarbazone.
35. 1-β-piperidinoethyl-isatin-3-thiosemicarbazone.
36. 1-γ-dimethylaminopropyl-isatin-3-thiosemicarbazone.
37. 1-γ-piperidinopropyl-isatin-3-thiosemicarbazone.

References Cited
UNITED STATES PATENTS

| | | | |
|---|---|---|---|
| 3,060,188 | 10/1962 | Marxer | 167—65.2 |
| 3,149,104 | 9/1964 | Lesher et al. | 167—65.2 |
| 3,156,699 | 11/1964 | Karmas | 167—65.2 |
| 3,177,204 | 4/1965 | Paquette | 167—65.2 |
| 3,186,999 | 6/1965 | Slack et al. | 167—65.2 |
| 3,238,215 | 3/1966 | Zenitz et al. | 167—65.2 |
| 3,253,991 | 5/1966 | Bauer et al. | 260—325 |

OTHER REFERENCES

Bauer et al., British J. Pharmacol., vol. 15 (1960), pp. 101–110.

Hellmann et al., Berichte, vol. 87 (1954), pp. 1684–1690.

Pettit et al., J. Org. Chem., vol. 27 (1962), pp. 1714–1717.

ALEX MAZEL, *Primary Examiner.*

NICHOLAS S. RIZZO, *Examiner.*

R. J. GALLAGHER, *Assistant Examiner.*